United States Patent
Yuhara

(10) Patent No.: US 7,303,716 B2
(45) Date of Patent: Dec. 4, 2007

(54) TWO-SIDED INMOLD TRANSFER MOLDING METHOD

(75) Inventor: Yukitomo Yuhara, Tokyo (JP)

(73) Assignee: Yoshida Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/545,570

(22) PCT Filed: Feb. 17, 2004

(86) PCT No.: PCT/JP2004/001722

§ 371 (c)(1),
(2), (4) Date: Oct. 20, 2006

(87) PCT Pub. No.: WO2004/073952

PCT Pub. Date: Sep. 2, 2004

(65) Prior Publication Data

US 2007/0063379 A1    Mar. 22, 2007

(30) Foreign Application Priority Data

Feb. 18, 2003 (JP) .......................... 2003-039759

(51) Int. Cl.
B29C 45/00 (2006.01)
B29C 45/14 (2006.01)

(52) U.S. Cl. .................. 264/313; 264/328.1; 264/132; 425/127

(58) Field of Classification Search .............. None
See application file for complete search history.

(56) References Cited

U.S. PATENT DOCUMENTS 4,825,320 A * 4/1989 Oishi et al. ............... 360/132
4,861,541 A * 8/1989 Kaminski et al. ......... 264/509
5,350,553 A * 9/1994 Glaser et al. ............. 264/155

FOREIGN PATENT DOCUMENTS

| JP | 62-227613    | * 10/1987 |
| JP | 62-227613 A  | 10/1987   |
| JP | 1-110924     | * 4/1989  |
| JP | 05-023172 B2 | 3/1993    |
| JP | 06-099458 A  | 4/1994    |
| JP | 08-267502 A  | 10/1996   |
| JP | 2000-296533 A| 10/2000   |
| JP | 2001-191362 A| 7/2001    |
| JP | 2001-260168 A| 9/2001    |
| JP | 2001-277294 A| 10/2001   |
| JP | 2003-039480 A| 2/2003    |
| JP | 2003-053779 A| 2/2003    |

* cited by examiner

Primary Examiner—Edmund H. Lee
(74) Attorney, Agent, or Firm—Birch, Stewart, Kolasch & Birch, LLP

(57) ABSTRACT

A two-sided inmold molding method utilizing continuous film passing between a stationary mold and a movable mold, which thereby prevents cut scraps from being mixed into a molded product and prevents striking pock from being formed on the molded product, and which is capable of enhancing the yield of the molded product.

2 Claims, 6 Drawing Sheets

TWO-SIDED INMOLD TRANSFER MOLDING METHOD

TECHNICAL FIELD

The present invention relates to a production method of a two-sided inmold molded product whose two sides are subjected to transfer printing.

BACKGROUND ART

There are various conventional production methods of a transfer molded product in which molding and transfer printing are carried out at the same time. A production method of a two-sided transfer molded product having a hole-forming mechanism for a film is disclosed in Japanese Patent Application Laid-open No.62-227613.

According to this production method of a two-sided transfer molded product, by a hole-forming mechanism provided at a stationary mold side, holes are formed in a film supply provided at a stationary mold side and a transfer film sent out by positioning. Resin is injected through this hole, and it is possible to easily obtain a transfer molded product whose two sides of various shapes are subjected to transfer printing.

According to such a conventional production method of a two-sided transfer molded product, however, there is a problem that it is necessary to form a hole in a film, cut scraps generated during the hole-forming operation remains in a cavity of a mold, the cut scraps enter a transparent molded product, the cut scraps attach to the mold and striking pocks are formed on a surface of the molded product, and yield of the molded product is deteriorated.

DISCLOSURE OF THE INVENTION

It is an object of the present invention to provide a production method of a two-sided inmold molded product capable of preventing cut scraps from being mixed into a molded product and preventing striking pock from being formed on the molded product, and capable of enhancing the yield of the molded product while eliminating the need for forming a hold in a film.

To achieve the above object, in a representative production method of two-sided inmold molded product according to the present invention for allowing a first continuous film and a second continuous film to pass between a stationary mold and a movable mold which respectively have cavities for molding a molded product, the stationary mold and the movable mold form an introduction passage a through which resin is introduced into the cavities when the stationary mold and the movable mold are clamped, the introduction passage is formed in a region through which the second continuous film passes, and in a direction intersecting with a sending direction of the first continuous film, and the two-sided inmold transfer molding method includes: a step for allowing the first continuous film to pass on the stationary mold side such that the second continuous film is opposed to the resin inlet a formed in the stationary mold, and for allowing the second continuous film to pass such as to intersect with the first continuous film on the movable mold side; and a step for injecting resin onto the second continuous film from the inlet a in a state in which the movable mold and the stationary mold are butted against each other, and allowing resin to flow between the first continuous film and the second continuous film from a side end surface of the first continuous film through the introduction passage a, thereby forming the molded product.

Further, two print patterns formed in the first continuous film or the second continuous film are arranged in a film-sending direction, resin is introduced from the introduction passage to the two print patterns through a branch point, the branch point is formed in a region where the second continuous film and the first continuous film are superposed on each other. By setting the branch point at the superposed portion between the first and second continuous films, the number of passages through which synthetic resin received by the first continuous film can pass between the first and second continuous films can be one, and the passage is branched off thereafter, a ratio of detective products caused when synthetic resin can not pass through the second continuous film well can be reduced.

BEST MODE FOR CARRYING OUT THE INVENTION

An embodiment of a two-sided inmold transfer molding method according to the present invention will be explained using the drawings.

Figure 1:
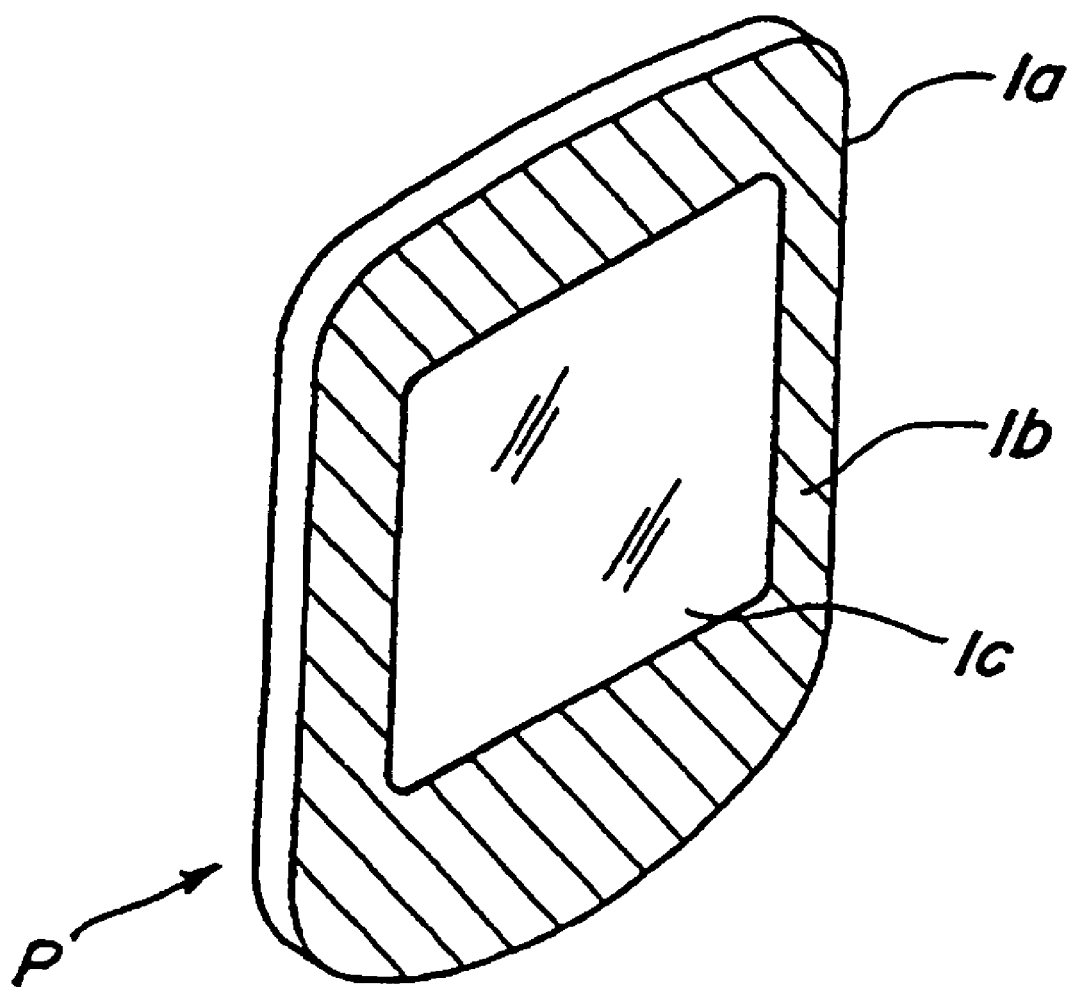
FIG. 1 is a perspective view of a protection panel formed by a production method of an embodiment.

FIG. 1 shows an example of a decorated resin molded product produced by this embodiment. The decorated resin molded product P is used as a panel of an electronic display window such as a cellular phone. The decorated resin molded product P shown in FIG. 1 is a clear acrylic plate body 1a, a frame 1b is printed on a periphery of the plate body 1a, and a clear display window 1c for displaying a liquid crystal screen is remained in a central portion of the decorated resin molded product P.

A production method of the decorated resin molded product P of this embodiment will be explained. This embodiment is an example according to an injection molding mold of a type in which two continuous films are sent out.

Figure 2:
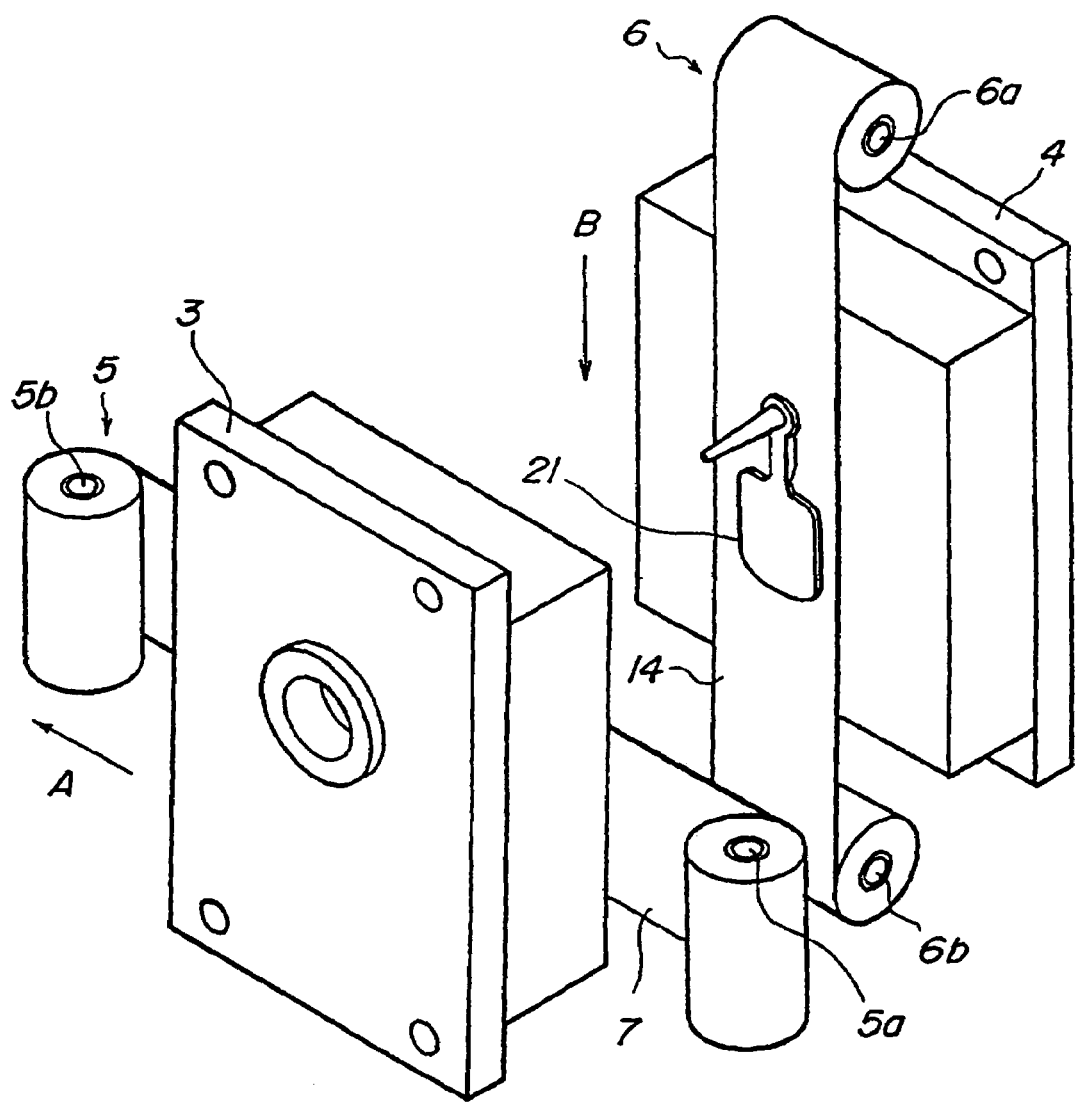
FIG. 2 is an explanatory view of a stationary mold, a movable mold and a continuous film.

As shown in FIG. 2, in a first step, a first continuous film 7 and a second continuous film 14 are allowed to continuously pass through between a stationary mold 3 and a movable mold 4 in directions intersecting with each other.

Figure 3:
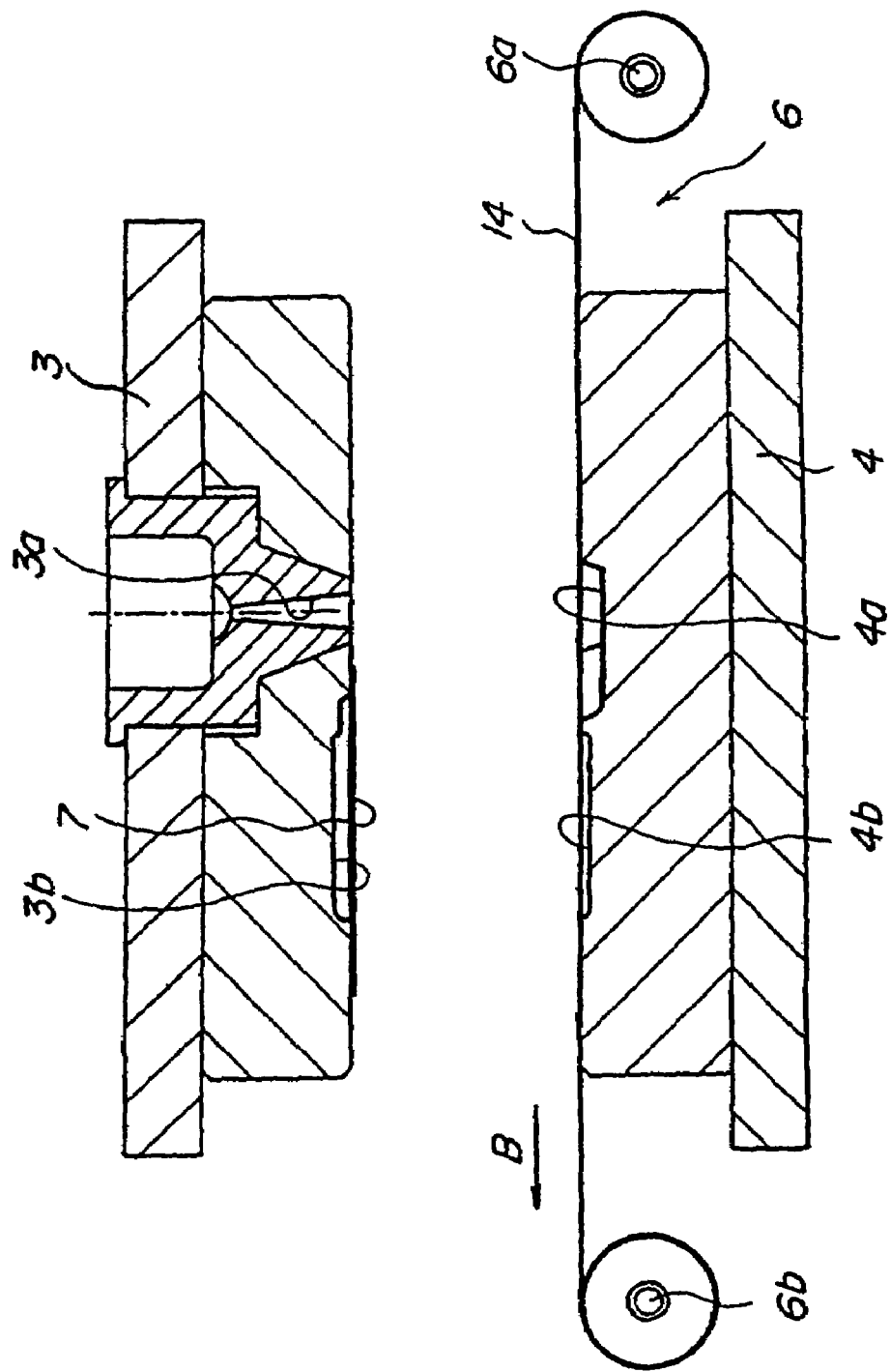
FIG. 3 is an explanatory view of a stage in which the continuous film is allowed to continuously pass through the stationary mold and the movable mold.

As shown in FIG. 3, the stationary mold 3 is formed with a cavity 3b, and an inlet 3a through which clear resin is injected. The movable mold 4 is formed with a cavity 4b, and in introduction passage 4a which is in communication with the cavity 4b.

The inlet 3a is provided at a location that is out of the passing region of the first continuous film 7, and at a location opposed to one end of the introduction passage 4a when the stationary mold 3 and the movable mold 4 are butted against each other to clamp the molds.

The introduction passage 4a through which resin is introduced into the cavities 3b and 4b is formed in a film-sending direction of the second continuous film 14 (direction of the arrow B) perpendicular to a film-sending direction of the first continuous film 7 (direction of the arrow A) in a passing region of the second continuous film 14 when the stationary mold 3 and the movable mold 4 are clamped.

As shown in FIG. 2, a first winding apparatus 5 and a second winding apparatus 6 are mounted on the stationary mold 3 and the movable mold 4, respectively. The winding apparatuses 5 and 6 have sending-out rolls 5a and 6a and take-up rolls 5b and 6b, respectively. The continuous films 7 and 14 are wound therebetween.

The first continuous film 7 and the second continuous film 14 are wound around the sending-out rolls 5a and 6a and held, tip ends of the continuous films 7 and 14 are allowed to pass between the stationary mold 3 and the movable mold 4, and are wound around the take-up rolls 5b and 6b, and the preparation is completed.

Only the second continuous film 14 is opposed to the inlet 3a. That is, the first continuous film 7 is disposed such that the first continuous film 7 is opposed only to the cavity 3b on the stationary mold side and an end surface of the first continuous film 7 passes through the introduction passage 4a, and the second continuous film 14 is disposed such that it opposed to the introduction passage 4a and the cavity 4b on the movable mold side. The winding apparatuses 5 and 6 are operated, the first continuous film 7 and the second continuous film 14 are intermittently sent between the stationary mold 3 and the movable mold 4 such that the first continuous film 7 and the second continuous film 14 intersect with each other. This intermittently sending operation is controlled such that the print pattern always agrees with the cavity 3b of the stationary mold 3 and the cavity 4b of the movable mold 4.

Figure 4:
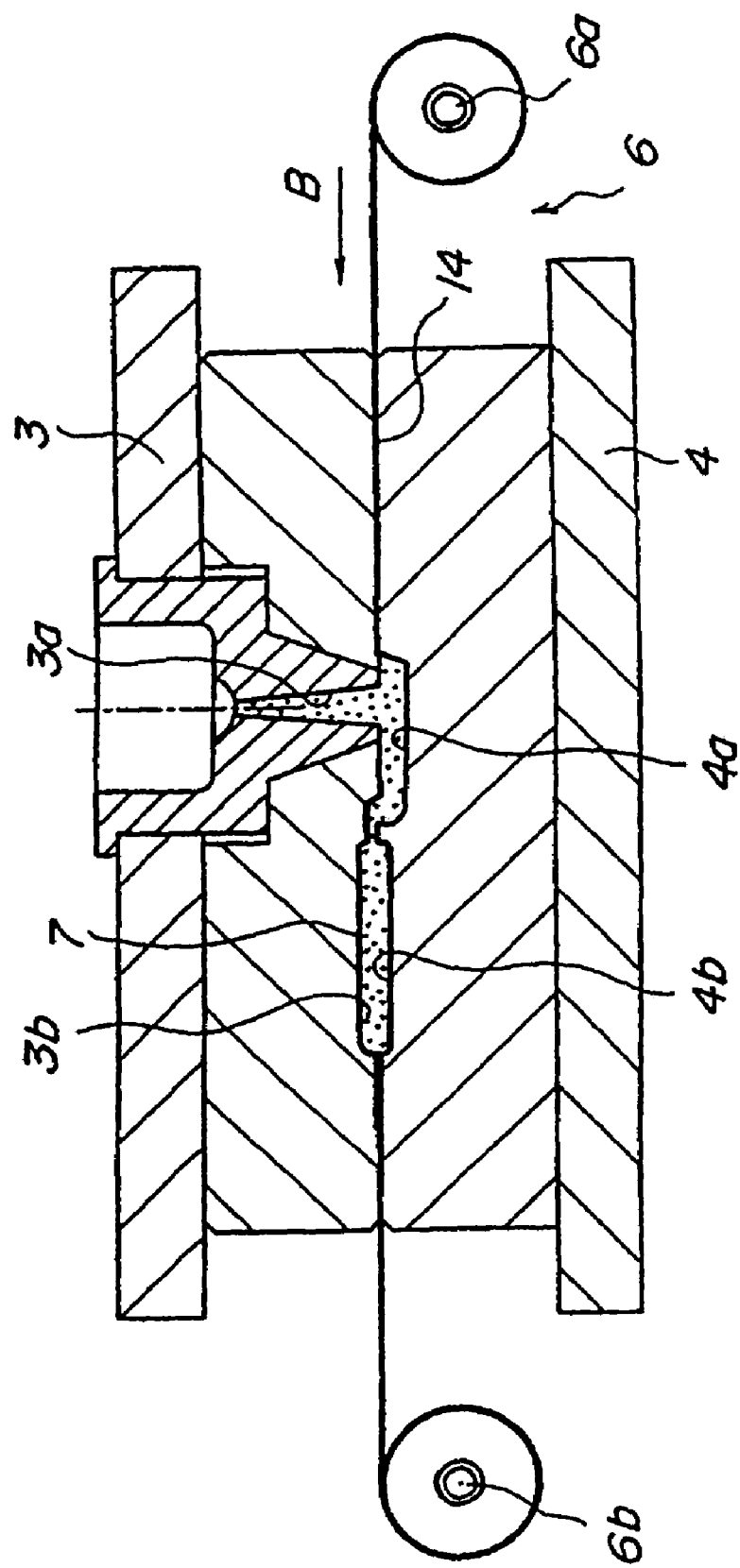
FIG. 4 is an explanatory view of a stage in which the stationary mold and the movable mold are butted against each other, resin is allowed to flow thereinto to form a molded product.

Next, an injection step of resin will be explained. As shown in FIG. 4, the print patterns of the first continuous film 7 and the second continuous film 14 are stopped at the positions of the cavities 3b and 4b and then, the stationary mold 3 and the movable mold 4 are butted against each other and clamped.

In the state in which the stationary mold 3 and the movable mold 4 are butted against each, clear resin is injected from the inlet 3a onto the second continuous film 14. The injected clear resin flows forward in the introduction passage 4a while biasing the second continuous film 14 against the movable mold, the introduction passage 4a is filled with the clear resin while biasing the first continuous film 7 from a side end surface of the first continuous film 7 against the stationary mold 3, the clear resin is charged into the cavities 3b and 4b while pushing the first continuous film 7 and the second continuous film 14 against the stationary mold and the movable mold, and a molded product 21 which is integral with the first continuous film 7 and the second continuous film 14 is formed.

Figure 5:
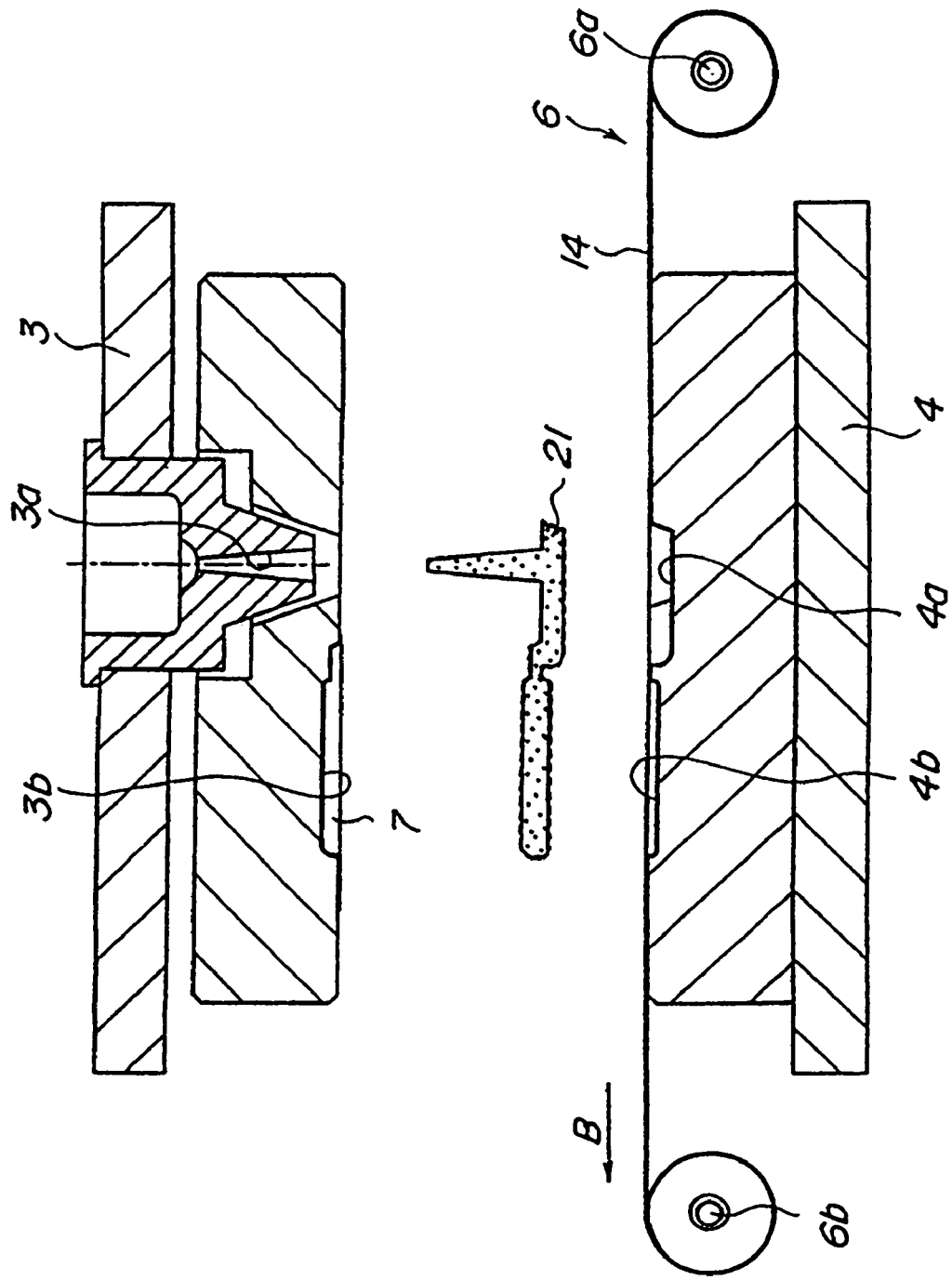
FIG. 5 is an explanatory view of a state in which the stationary mold and the movable mold are opened to take out the molded product.

Then, as shown in FIG. 5, the stationary mold 3 and the movable mold 4 are opened after the molded product 21 is hardened, the molded product 21 and the continuous films 7 and 14 are separated together with the first continuous film 7 and the second continuous film 14, and the molded product 21 is taken out. Then, a sprue forming portion which is a forming portion remained in the inlet is cut and removed to form a Protection panel P1.

As described above, the first continuous film 7 is allowed to pass on the stationary mold side and the second continuous film 14 is allowed to pass such as to intersect with the first continuous film 7 such that the second continuous film 14 is opposed to the resin inlet 3a formed in the stationary mold 3. Then, resin is injected from the inlet 3a onto the second continuous film 14 in a state in which the movable mold 4 and the stationary mold 3 are butted against each other, the resin is allowed to flow between the first continuous film 7 and the second continuous film 14 from the side end surface of the first continuous film 7 through the introduction passage 4a, thereby forming the molded product 21. With this, it is possible to prevent the clear resin from entering between the continuous film and the mold. Since this forming method does not require to form a hold, it is possible to prevent cut scraps from being mixed into the molded product 21 and prevent striking pock from being formed on the molded product 21, and to enhance the yield of the molded product 21.

The introduction passage 4a is formed in the film-sending direction of the second continuous film 14 (direction of the arrow B, see FIG. 2) perpendicular to the film-sending direction of the first continuous film 7 (direction of the arrow A, see FIG. 2) in the passing region of the second continuous film 14, and the inlet 3a is formed in the region out of the passing region of the first continuous film 7, and is located at the position where the inlet 3a is opposed to the one end of the introduction passage 4a when the stationary mold 3 and the movable mold 4 are butted against each other and clamped. If these conditions are satisfied, the introduction passage 4a and the inlet 3a are not limited to the shapes of this embodiment.

Figure 6:
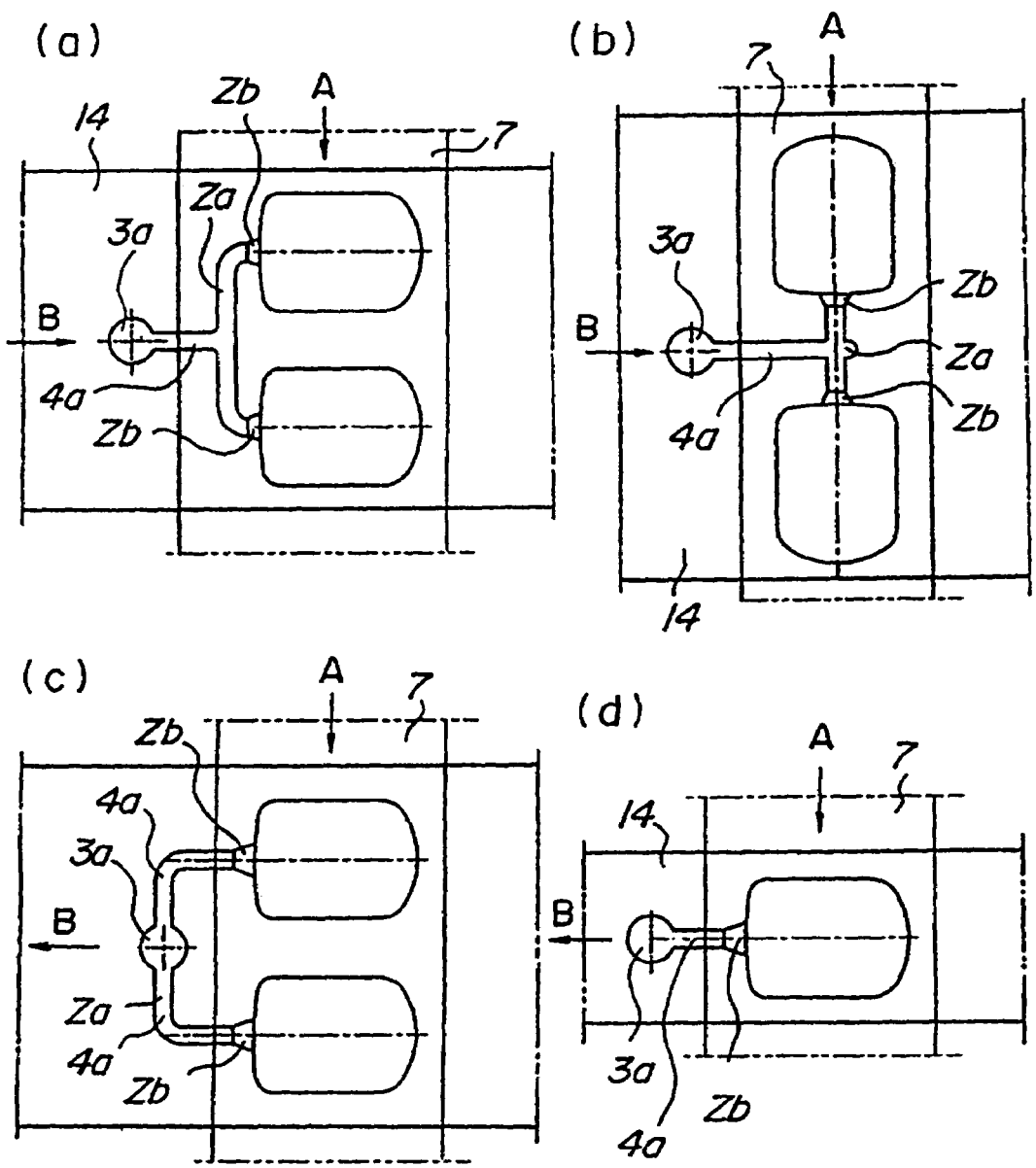
FIG. 6 are explanatory views of layout of an introduction passage and a print pattern.

For example, as shown in FIG. 6A, two print patterns may be arranged in the film-sending direction (direction of arrow A) of the first continuous film 7, the molded product 21 may be formed from the one introduction passage 4a such that the molded product 21 is connected to the two print patterns, and a branch point Za of the introduction passage 4a may be formed in the region of the first continuous film 7. By setting the branch point in the superposed portion between the first and second continuous films in this manner, a number of passages through which synthetic resin received by the first continuous film can pass between the first and second continuous films can be one, and the passage is branched off thereafter, a ratio of defective products caused when synthetic resin can not pass through the second continuous film well can be reduced.

Alternatively, as shown in FIG. 6B, two print patterns may be arranged in the film-sending direction (direction of arrow A) of the first continuous film 7 such that connected portions Zb with respect to the introduction passage 4a are opposed to each other, the molded product 21 may be formed such that the molded product 21 is connected to the two print patterns from the one introduction passage 4a, and the branch point Za of the introduction passage 4a may be disposed in the region of the first continuous film 7 and between the two print patterns.

Alternatively, as shown in FIG. 6C, two print patterns may be arranged in the film-sending direction (direction of arrow A) of the first continuous film 7, the molded product 21 may be formed such that it is connected to the two print pattern from the one introduction passage 4a, and the branch point Za of the introduction passage 4a may be formed in a region out of the first continuous film 7.

Alternatively, as shown in FIG. 6D, the print pattern may be formed in the film-sending direction (direction of arrow B) of the second continuous film 14, and the introduction passage 4a may be formed straightly.

As explained above, the first continuous film is allowed to pass on the stationary mold side such that the second continuous film is opposed to the resin inlet formed in the stationary mold, the second continuous film is allowed to pass such as to intersect with the first continuous film on the movable mold side, the movable mold and the stationary mold are butted against each other, resin is injected onto the second continuous film from the inlet, resin is allowed to flow between the first continuous film and the second continuous film from the side end surface of the first continuous film through the introduction passage, thereby forming the molded product. With this, it is possible to prevent the clear resin from entering between the continuous film and the mold. Since this forming method does not require to form a hold, it is possible to prevent cut scraps from being mixed into the molded product and prevent striking pock from being formed on the molded product, and to enhance the yield of the molded product.

The invention claimed is:

1. A two-sided inmold transfer molding method for allowing a first continuous film and a second continuous film to pass between a stationary mold and a movable mold which respectively have cavities for molding a molded product, wherein the stationary mold and the movable mold form an introduction passage through which resin is introduced into the cavities when the stationary mold and the movable mold are clamped, the introduction passage is formed in a region through which the second continuous film passes, and in a direction intersecting with a sending direction of the first continuous film, the two-sided inmold transfer molding method comprises:

a step for passing the first continuous film on the stationary mold side such that the second continuous film is opposed to the resin inlet formed in the stationary mold, and for passing the second continuous film such as to intersect with the first continuous film on the movable mold side, and a step for injecting resin onto the second continuous film from the inlet in a state in which the movable mold and the stationary mold are butted against each other, and allowing resin to flow between the first continuous film and the second continuous film from a side end surface of the first continuous film through the introduction passage, thereby forming the molded product.

2. The two-sided inmold transfer molding method according to claim 1, wherein two print patterns formed in the first continuous film or the second continuous film are arranged in a film-sending direction, resin is introduced from the introduction passage to the two print patterns through a branch point, the branch point is formed in a region where the second continuous film and the first continuous film are superposed on each other.

* * * * *